United States Patent
Yang

(10) Patent No.: US 9,933,541 B2
(45) Date of Patent: Apr. 3, 2018

(54) DETERMINING RESISTIVITY ANISOTROPY AND FORMATION STRUCTURE FOR VERTICAL WELLBORE SECTIONS

(75) Inventor: Jian Yang, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1124 days.

(21) Appl. No.: 13/166,034

(22) Filed: Jun. 22, 2011

(65) Prior Publication Data

US 2011/0309833 A1    Dec. 22, 2011

Related U.S. Application Data

(60) Provisional application No. 61/357,164, filed on Jun. 22, 2010.

(51) Int. Cl.
*G01V 3/28* (2006.01)
*G01V 3/30* (2006.01)

(52) U.S. Cl.
CPC ..................... *G01V 3/28* (2013.01)

(58) Field of Classification Search
CPC ....................................................... G01V 3/28
USPC .......................................................... 324/338
See application file for complete search history.

(56) References Cited

U.S. PATENT DOCUMENTS

| | | | | |
|---|---|---|---|---|
| 6,594,584 B1 * | 7/2003 | Omeragic | ................ | G01V 3/28 |
| | | | | 702/9 |
| 7,019,528 B2 * | 3/2006 | Bittar | ....................... | G01V 3/30 |
| | | | | 324/337 |
| 7,382,135 B2 * | 6/2008 | Li | ........................... | G01V 3/30 |
| | | | | 324/338 |
| 7,755,361 B2 * | 7/2010 | Seydoux | ................ | G01V 3/28 |
| | | | | 324/333 |
| 8,085,050 B2 * | 12/2011 | Bittar et al. | ................. | 324/339 |

(Continued)

OTHER PUBLICATIONS

Mund, Bernhard et al., Balunless measurement of coupling attenuation of balanced cables and components, Wire & Cable Tech Inter, Jul. 2013, p. 1-3.*

(Continued)

*Primary Examiner* — Bot Ledynh

(57) ABSTRACT

Formation properties in a vertical section of a wellbore are determined by considering the vertical section as consisting of one or more segments. Measurements are obtained with a directional resistivity tool at two or more measurement stations within each segment for which the complex $0^{th}$ harmonic coefficients for the obtained measurements are non-trivially different from one another. For each such segment, the phase shift and attenuation are determined using the complex $0^{th}$ harmonic coefficients obtained for that segment and an inversion is performed for the formation properties using the determined phase shift and attenuation for that segment. Formation properties for that segment may be output to a display or memory storage device. For certain segments, one or more gain factors may be obtained. The gain factors are used to correct the measured voltages for certain neighboring segments and the corrected voltages inverted to obtain anisotropy and formation structure.

14 Claims, 3 Drawing Sheets

(56) References Cited

U.S. PATENT DOCUMENTS

| | | | | |
|---|---|---|---|---|
| 8,193,813 B2* | 6/2012 | Seydoux | ................. | G01V 3/30 |
| | | | | 324/338 |
| 2005/0051327 A1* | 3/2005 | Vinegar | ................. | E21B 36/02 |
| | | | | 166/256 |
| 2005/0140373 A1* | 6/2005 | Li | ............................ | G01V 3/30 |
| | | | | 324/338 |
| 2008/0136419 A1* | 6/2008 | Seydoux | ................. | G01V 3/28 |
| | | | | 324/333 |

OTHER PUBLICATIONS

Schlumberger—(Chou et al.), Steering Toward Enhanced Production, PeriScope 15, Oilfield Review, 2005, p. 54-63.*

* cited by examiner

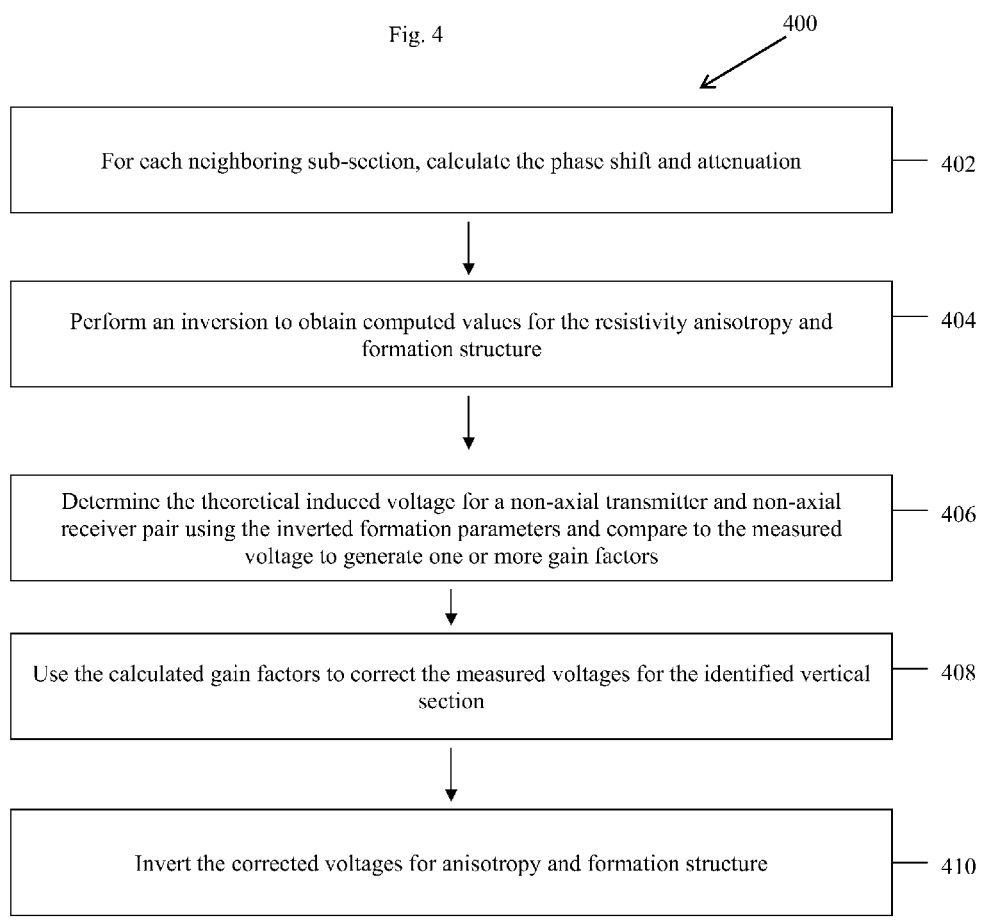

DETERMINING RESISTIVITY ANISOTROPY AND FORMATION STRUCTURE FOR VERTICAL WELLBORE SECTIONS

CROSS-REFERENCE TO OTHER APPLICATIONS

This application claims priority to and the benefit of U.S. Provisional Application Serial Number 61/357,164, filed on Jun. 22, 2010.

BACKGROUND

Technical Field

This disclosure relates generally to oil and gas well logging, and more specifically, to directional resistivity measurements. Still more specifically, two embodiments of a method are disclosed for determining resistivity anisotropy and formation structure from deep resistivity measurements in vertical wellbore sections. Other measurements are disclosed as well.

Description of the Related Art

An alternative to wireline logging techniques is the collection of data on downhole conditions during the drilling process. By collecting and processing such information during the drilling process, the driller can modify or correct key steps of the operation to optimize performance. Schemes for collecting data of downhole conditions and movement of the drilling assembly during the drilling operation are known as measurement-while-drilling ("MWD"). Similar techniques focusing more on measurement of formation parameters than on movement of the drilling assembly are known as logging-while-drilling ("LWD"). However, the terms MWD and LWD are often used interchangeably, and the use of either term in this disclosure will be understood to include both the collection of formation and wellbore information, as well as data on movement and placement of the drilling assembly.

Measurement-while-drilling (MWD) tools are available to guide drill strings and therefore the resulting wellbores into more productive reservoir zones. MWD tools used for this purpose typically have been propagation resistivity tools, also known as array compensated resistivity (ARC) tools, with a 360° measurement and deep imaging capability to detect fluid contacts and formation changes up to 15 feet from the wellbore. Measurements are commonly made of the phase-shift and attenuation of the signals at the receiver coils, which are indicative of the formation conductivity.

Currently available ARC tools are non-azimuthal and use two receivers to compensate for any electronic drift associated with the transmitter. The electronic drift associated with the two receivers and any imbalance between the two receivers is removed using a scheme called borehole compensation, which involves the use of a second transmitter symmetrically placed with respect to the first transmitter. The transmitters are alternately energized so two phase shifted signals can be measured when the two transmitter coils operate at identical frequencies. However, using two transmitter coils alternately slows the rate of data acquisition, which can lead to errors due to the time delay between sequential measurements. Further, use of multiple transmitters may require the signals to be time-multiplexed when operating at the same frequency to avoid cross-talk. Multiplexing slows the rate of data acquisition. The errors due to time delays are magnified when drilling rates are high.

Another problem associated with conventional propagation resistivity or ARC tools is that the magnetic dipole moments of the transmitters and receivers are oriented axially with respect to the tool axis. Such measurements are only sensitive to or affected by the anisotropy when the relative dip angle ($\theta$) is greater than 45°. Further, in homogeneous formations, vertical resistivity and relative dip angle are coupled. As a result, even with a relative high dip angle, simultaneous determination of horizontal resistivity ($R_h$), vertical resistivity ($R_v$), and the relative dip angle ($\theta$) is not possible for homogeneous formations. Environmental effects may break the coupling between $R_h$ and $\theta$, but that is uncertain and variable from formation to formation.

As an improvement over propagation resistivity or ARC tools, Schlumberger developed the PERISCOPE™ 15 deep imaging LWD tool, which incorporates tilted and transverse antennas in the drilling collar. The non-axial antennae obtain directional electromagnetic measurements. One can define the attenuation ATT as a logarithmic function of the ratio between two different linear combinations of the electromagnetic coupling tensor coefficients $V_{xx}$, $V_{yy}$, and $V_{zx}$:

$$ATT = 20\log_{10}\left(\text{abs}\left(\frac{V_{xx}+V_{yy}+V_{xz}}{V_{xx}+V_{yy}-V_{xz}}\right)\right) \tag{1a}$$

and the phase shift PS as the difference between two arctangent functions, using real and imaginary components of the electromagnetic coupling tensor components, at the same wellbore station:

$$PS = a\tan\left(\frac{V_{xx}^i+V_{yy}^i-V_{xz}^i}{V_{xx}^r+V_{yy}^r-V_{xz}^r}\right) - a\tan\left(\frac{V_{xx}^i+V_{yy}^i+V_{xz}^i}{V_{xx}^r+V_{yy}^r+V_{xz}^r}\right). \tag{1b}$$

These directional measurements, for which the electronic drifts of both the transmitter and receiver are removed (or gain corrected), are used to determine the distance to and azimuthal orientation of formation boundaries in any type of mud. These measurements are typically transmitted uphole and displayed on a graphical interface to provide information on distance to boundaries, formation resistivity, and orientation. These measurements are sensitive to resistivity anisotropy even at very low relative angles (e.g., 10°), which is critical in low resistivity pay zones and in laminated formations because accurate identification and characterization of hydrocarbon reserves is not possible without knowing the resistivity anisotropy.

Unfortunately, the azimuthal sensitivity of a non-axial transmitter/receiver pair disappears in a perfectly vertical section with 0° relative dip angle $\theta$. In other words, the $1^{st}$ and the $2^{nd}$ harmonic coefficients (i.e., $C_{1c}$, $C_{1s}$, $C_{2c}$, and $C_{2s}$), which contribute to the azimuthal sensitivity (as seen from Equation 2 below), vanish as the dip angle $\theta$ approaches zero:

$$V(\vec{r},\varphi) = C_0(\vec{r}) + C_{1c}(\vec{r})\cos(\varphi) + C_{1s}(\vec{r})\sin(\varphi) + C_{2c}(\vec{r})\cos(2\varphi) + C_{2s}(\vec{r})\sin 2\varphi) \tag{2}$$

As a result, the directional measurements defined in Equations 1a and 1b are zero, therefore improved methods for inverting tool data for resistivity anisotropy and dip angle $\theta$ for vertical wellbore sections are needed.

SUMMARY OF THE DISCLOSURE

In satisfaction of the aforenoted needs, embodiments of a new method are disclosed for inverting resistivity data for resistivity anisotropy and formation structure information such as relative dip angle for vertical wellbore sections. In the disclosed method, resistivity anisotropy and/or formation structure can be determined from measurements taken in vertical wellbore sections.

Formation properties in a vertical section of a wellbore are determined by considering the vertical section as consisting of one or more segments. Measurements are obtained with a directional resistivity tool at two or more measurement stations within each segment for which the complex $0^{th}$ harmonic coefficients for the obtained measurements are non-trivially different from one another. For each such segment, the phase shift and attenuation are determined using the complex $0^{th}$ harmonic coefficients obtained for that segment and an inversion is performed for the formation properties using the determined phase shift and attenuation for that segment. Formation properties for that segment may be output to a display or memory storage device.

For certain segments, one or more gain factors may be obtained. The gain factors are used to correct the measured voltages for certain neighboring segments and the corrected voltages inverted to obtain anisotropy and formation structure.

To reiterate, in one embodiment, one step comprises identifying a first segment of a wellbore and a second segment of the wellbore. One or more gain factors for the second section are calculated and assumed to apply to the nearby first segment. Alternatively, in another embodiment, a segment within a vertical section is identified where the complex $0^{th}$ harmonic coefficient varies from measurement station to measurement station. One or more gain factors for that particular segment are calculated and assumed to apply to the rest of the vertical section. Therefore, for N measurement stations with N complex $0^{th}$ harmonic coefficients $C_0(\vec{r}_1), \ldots C_0(\vec{r}_N)$ within the identified segment of the vertical section, the method comprises calculating an attenuation value ATT and a phase shift value PS based on Equations 3a and 3b, or 3c and 3d, respectively:

$$ATT = 20\log_{10}\left(abs\left(\frac{V_{xx}(\vec{r}_i) + V_{yy}(\vec{r}_i)}{V_{xx}(\vec{r}_j) + V_{yy}(\vec{r}_j)}\right)\right) \quad (3a)$$

$$PS = atan\left(\frac{V_{xx}^i+(\vec{r}_j) + V_{yy}^i(\vec{r}_j)}{V_{xx}^r(\vec{r}_j) + V_{yy}^r(\vec{r}_j)}\right) - atan\left(\frac{V_{xx}^i(\vec{r}_i) + V_{yy}^i(\vec{r}_i)}{V_{xx}^r(\vec{r}_i) + V_{yy}^r(\vec{r}_i)}\right) \quad (3b)$$

$$ATT = 20\log_{10}\left(abs\left(\frac{C_0(\vec{r}_i)}{C_0(\vec{r}_j)}\right)\right) \quad (3c)$$

$$PS = atan\left(\frac{C_0^i(\vec{r}_j)}{C_0^r(\vec{r}_j)}\right) - atan\left(\frac{C_0^i(\vec{r}_i)}{C_0^r(\vec{r}_i)}\right). \quad (3d)$$

The superscripts i and r refer to real and imaginary parts, respectively, and the subscripts i and j refer to two different tool locations or measurement stations, respectively. The "atan" means the arctangent. Using the results from Equations 3a and 3b (or 3c and 3d), with or without other measurements, resistivity anisotropy and formation structure can be calculated for the vertical wellbore section.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail on the accompanying drawings, wherein:

FIG. 4 is a flowchart showing the steps of an alternative embodiment, in accordance with the present disclosure.

It should be understood that the drawings are not to scale and that the disclosed embodiments are sometimes illustrated diagrammatically and in partial views. In certain instances, details that are not necessary for an understanding of the disclosed method and apparatus or that would render other details difficult to perceive may have been omitted. It should be understood that this disclosure is not limited to the particular embodiments illustrated herein.

DETAILED DESCRIPTION

Figure 1:
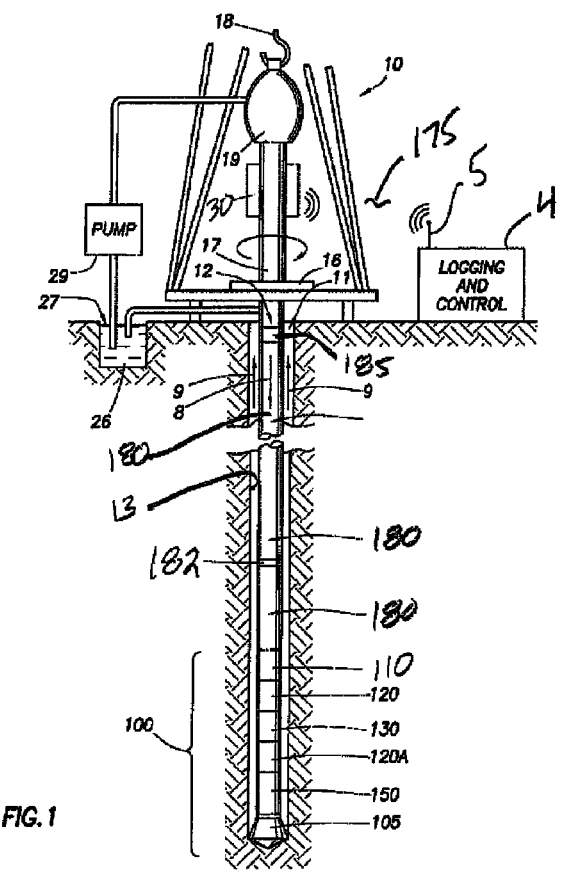
FIG. 1 illustrates, partially in schematic and block form, a wellsite system that can be used for formation evaluation, in accordance with the present disclosure.

FIG. 1 illustrates a wellsite system. The wellsite can be onshore or offshore. In this exemplary system, a wellbore 11 is formed in subsurface formations by rotary drilling in a manner that is well known. Directional drilling can also be performed.

A drill string 12 is suspended within wellbore 11 and has a bottom hole assembly (BHA) 100 that includes a drill bit 105 at its lower end. The surface system includes platform and derrick assembly 10 positioned over the wellbore 11 and the assembly 10 includes a rotary table 16, kelly 17, hook 18, and rotary swivel 19. The drill string 12 is rotated by the rotary table 16, energized by means not shown, that engages the kelly 17 at the upper end of the drill string 12. The drill string 12 is suspended from hook 18, attached to a traveling block (also not shown), and the rotary swivel 19 permits rotation of the drill string 12 relative to the hook. As is well known, a top drive system could alternatively be used.

The surface system of FIG. 1 further includes drilling fluid or mud 26 stored in a pit 27 formed at the wellbore site. A pump 29 delivers the drilling fluid 26 to the interior of the drill string 12 via a port in the swivel 19, causing the drilling fluid 26 to flow downwardly through the drill string 12 as indicated by the directional arrow 8. The drilling fluid 26 exits the drill string 12 via ports in the drill bit 105, and then circulates upwardly through the annular region between the outside of the drill string 12 and the wall 13 of the wellbore 11, as indicated by the directional arrows 9. In this known manner, the drilling fluid 26 lubricates the drill bit 105 and carries formation cuttings up to the surface. The cuttings are typically removed from the drilling fluid 26 before it is returned to the pit 27 for recirculation.

The bottom hole assembly 100 includes a logging-while-drilling (LWD) module 120, a measuring-while-drilling (MWD) module 130, a roto-steerable system and motor 150, and drill bit 105. The LWD module 120 is housed in a special type of drill collar, as is known in the art, and can contain one or a plurality of known types of logging tools. It will also be understood that more than one LWD and/or MWD module can be employed, e.g., as represented at 120A. References, throughout, to a module at the position of 120 can alternatively mean a module at the position of 120A as well. The LWD module 120 includes capabilities for measuring, processing, and storing information, as well as for communicating with the surface equipment. The LWD module 120 may include, for example, a directional resistivity measuring device.

The MWD module 130 is also housed in a type of drill collar, as is known in the art, and can contain one or more devices for measuring characteristics of the drill string and drill bit. The MWD tool 130 further includes an apparatus (not shown) for generating electrical power to the downhole system, such as a mud turbine generator powered by the flow of the drilling fluid. Other power and/or battery systems may be employed. The MWD module 130 may include one or more of the following types of measuring devices: a weight-on-bit measuring device, a torque measuring device, a vibration measuring device, a shock measuring device, a stick-slip measuring device, a direction measuring device, and an inclination measuring device.

In the system of FIG. 1, a drill string telemetry system is employed that, in the illustrated embodiment, comprises a system of inductively coupled wired drill pipes 180 that extend from a surface sub 185 to an interface sub 110 in the bottom hole assembly 100. Depending on factors including the length of the drill string, relay subs or repeaters 182 can be provided at intervals in the string of wired drill pipes 180. The interface sub 110 provides an interface between the communications circuitry of the LWD and MWD modules 120, 130 and the drill string telemetry system that, in this embodiment, comprises inductively coupled wired drill pipes 180. The wired drill pipes 180 can be coupled with an electronics subsystem 30 that rotates with kelly 17 and includes a transceiver and antenna that communicate bi-directionally with antenna and transceiver of logging and control unit 4, which includes an uphole processor subsystem. In FIG. 1, a communication link 175 is schematically depicted between the electronics subsystem 30 and antenna 5 of the logging and control unit 4. Accordingly, the configuration of FIG. 1 provides a communication link from the logging and control unit 4 through communication link 175, to surface sub 185, through the wired drill pipe telemetry system, to downhole interface 110 and the components of the bottom hole assembly 110 and, also, the reverse thereof, for bi-directional operation.

While only one logging and control unit 4 at one wellsite is shown, one or more surface units across one or more wellsites may be provided. The surface units may be linked to one or more surface interfaces using a wired or wireless connection via one or more communication lines. The communication topology between the surface interface and the surface system can be point-to-point, point-to-multipoint or multipoint-to-point. The wired connection includes the use of any type of cables or wires using any type of protocols (serial, Ethernet, etc.) and optical fibers. The wireless technology can be any kind of standard wireless communication technology, such as IEEE 802.11 specification, Bluetooth, zigbee or any non-standard RF or optical communication technology using any kind of modulation scheme, such as FM, AM, PM, FSK, QAM, DMT, OFDM, etc. in combination with any kind of data multiplexing technologies such as TDMA, FDMA, CDMA, etc.

Figure 2:
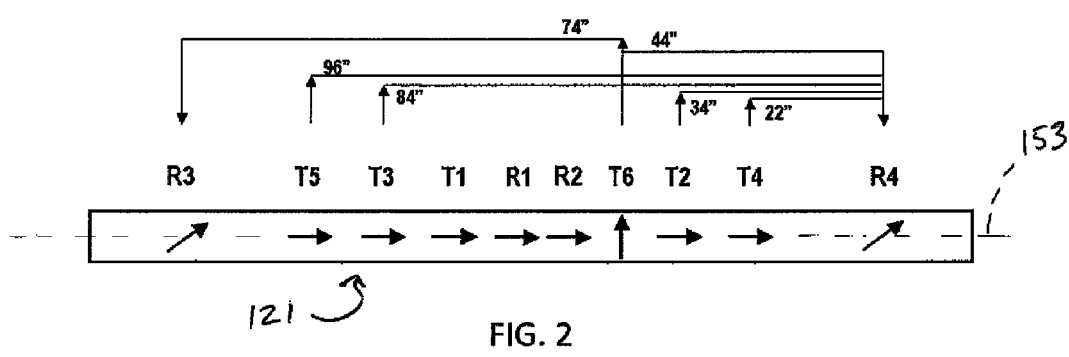
FIG. 2 is a partial schematic view of a deep imaging resistivity tool that can be used for formation evaluation, in accordance with the present disclosure.

FIG. 2 is a simplified schematic view of a directional deep-reading logging-while-drilling tool 121, as part of the LWD tool or tools 120 in FIG. 1. Signals from tools having axially aligned cylindrically symmetrical coils are not directionally sensitive. The tool 121 of FIG. 2 includes five axially aligned transmitters T1-T5, a transverse transmitter T6 and two tilted receivers R3, R4 for obtaining directionally sensitive measurements and compensated phase shift and attenuation values. Transmitter T4 and receiver R3 can be used for a directional measurement, or combined with the directional measurement from another pair such as T5/R4 to form a symmetrized or anti-symmetrized measurement.

The method disclosed herein allows for the determining of resistivity anisotropy and formation structure information for a vertical formation section. A voltage at a receiver R4 induced by an electromagnetic field transmitted from a transmitter T6 is given by Equation 2 above (repeated here):

$$V(\vec{r},\varphi) = C_0(\vec{r}) + C_{1c}(\vec{r})\cos(\varphi) + C_{1s}(\vec{r})\sin(\varphi) + C_{2c}(\vec{r})\cos(2\varphi) + C_{2s}(\vec{r})\sin 2\varphi)$$

wherein $\vec{r}$ is a measurement reference position and $\theta$ is the azimuth angle of the receiver. Complex coefficients $C_0, C_{1c}, C_{1s}, C_{2c}$ and $C_{2s}$, defined below, represent the complex $0^{th}$, $1^{st}$, and $2^{nd}$ harmonic coefficients of the voltage:

$$C_0(\vec{r}) = \frac{1}{2}(V_{xx}(\vec{r}) + V_{yy}(\vec{r}))\sin(\theta_R)\sin(\theta_T)\cos(\phi_T); \quad (4)$$

$$C_{1c}(\vec{r}) = V_{zx}(\vec{r})\cos(\theta_R)\sin(\theta_T)\cos(\phi_B - \phi_T);$$

$$C_{1s}(\vec{r}) = V_{zx}(\vec{r})\cos(\theta_R)\sin(\theta_T)\sin(\phi_B - \phi_T);$$

$$C_{2c}(\vec{r}) = \frac{1}{2}(V_{xx}(\vec{r}) - V_{yy}(\vec{r}))\sin(\theta_R)\sin(\theta_T)\cos(2\phi_B - \phi_T);$$

$$C_{2s}(\vec{r}) = \frac{1}{2}(V_{xx}(\vec{r}) - V_{yy}(\vec{r}))\sin(\theta_R)\sin(\theta_T)\sin(2\phi_B - \phi_T);$$

where $\theta_R$ and $\theta_T$ are the receiver and transmitter angles, respectively, with respect to the tool axis 153, $\varphi_T$ is the azimuth angle of the transmitter relative to the receiver, and $\varphi_B$ is the azimuthal angle of the bed boundary.

Because only three electromagnetic coupling components, $V_{xx}$, $V_{yy}$, and $V_{zx}$, are involved in the expressions for the complex coefficients, their analytic solutions, apart from a gain factor, and the solution for the bed boundary angle $\varphi_B$, can be obtained easily. Further, a number of measurements can be based on a logarithmic ratio of different linear combinations of $V_{xx}$, $V_{yy}$, and $V_{zx}$. While these measurements are sensitive to resistivity anisotropy and relative dip angle $\theta$, they are zero in a vertical wellbore section, as explained above. The disclosed method and refinements thereof, as described below, circumvent the problem of measurements that use linear combinations of $V_{xx}$, $V_{yy}$, and $V_{zx}$ when those components are zero in vertical wellbore sections.

Instead of defining the measurement based on the logarithmic ratio of different linear combinations of $V_{xx}$, $V_{yy}$, and $V_{zx}$ measured at the same tool location $\vec{r}$, a new measurement is based on the logarithmic ratio of a linear combination of $V_{xx}$, $V_{yy}$, and $V_{zx}$ measured at a first tool location $\vec{r}_1$, and another linear combination of $V_{xx}$, $V_{yy}$, and $V_{zx}$ measured at a second tool location $\vec{r}_2$. The form of the two linear combinations does not have to be identical. However, for ease of discussion, the same linear combination, $V_{xx} + V_{yy}$, is used below. Specifically, two new measurements, attenuation and phase shift, are defined in Equations 5a-5b below:

$$ATT = 20\log_{10}\left(\text{abs}\left(\frac{V_{xx}(\vec{r}_1) + V_{yy}(\vec{r}_1)}{V_{xx}(\vec{r}_2) + V_{yy}(\vec{r}_2)}\right)\right); \quad (5a)$$

-continued $$PS = a\tan\left(\frac{V_{xx}^i(\vec{r}_2) + V_{yy}^i(\vec{r}_2)}{V_{xx}^r(\vec{r}_2) + V_{yy}^r(\vec{r}_2)}\right) - a\tan\left(\frac{V_{xx}^i(\vec{r}_1) + V_{yy}^i(\vec{r}_1)}{V_{xx}^r(\vec{r}_1) + V_{yy}^r(\vec{r}_1)}\right); \quad (5b)$$

where the superscripts r and i indicates the real and imaginary parts, respectively. Equations 5a-5b can also be rewritten in terms of the $0^{th}$ harmonic coefficients as shown below in Equations 5a'-5b':

$$ATT = 20\log_{10}\left(abs\left(\frac{C_0(\vec{r}_1)}{C_0(\vec{r}_2)}\right)\right) \quad (5a')$$

$$PS = a\tan\left(\frac{C_0^i(\vec{r}_2)}{C_0^r(\vec{r}_2)}\right) - a\tan\left(\frac{C_0^i(\vec{r}_1)}{C_0^r(\vec{r}_1)}\right). \quad (5b')$$

More general expressions for $i^{th}$ and $j^{th}$ measurement stations are given by:

$$ATT = 20\log_{10}\left(abs\left(\frac{C_0(\vec{r}_i)}{C_0(\vec{r}_j)}\right)\right) \quad (5c)$$

$$PS = a\tan\left(\frac{C_0^i(\vec{r}_j)}{C_0^r(\vec{r}_j)}\right) - a\tan\left(\frac{C_0^i(\vec{r}_i)}{C_0^r(\vec{r}_i)}\right). \quad (5d)$$

Figure 3:
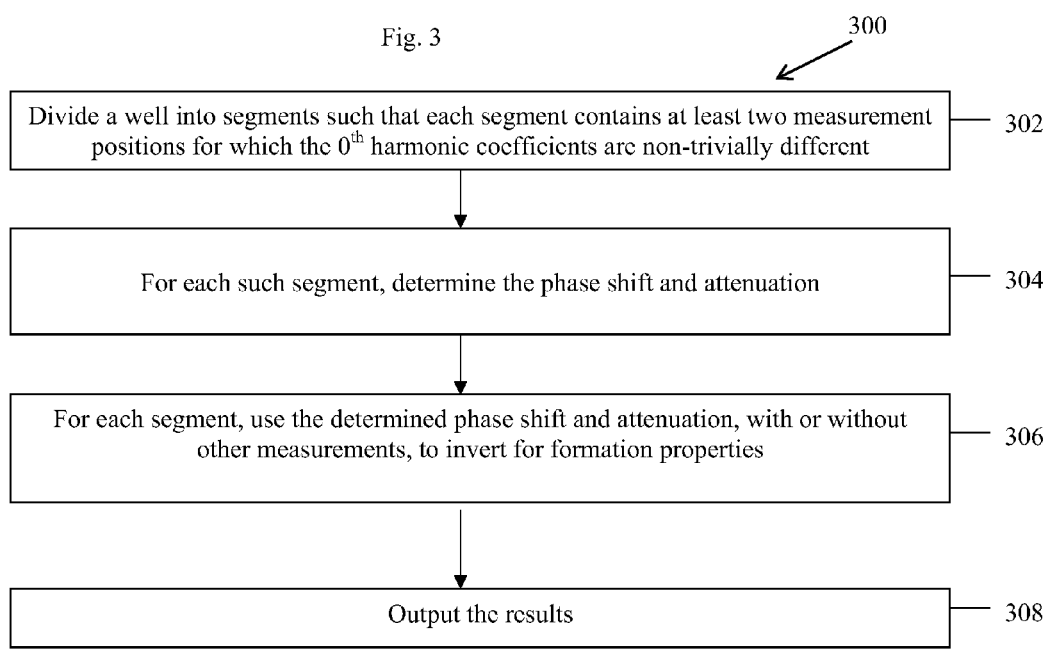
FIG. 3 is a flowchart showing the steps of one embodiment, in accordance with the present disclosure.

The phase shift and attenuation values defined by the various Equation 5 pairs above are not zero so long as the formation properties and/or structures around $\vec{r}_1$ and $\vec{r}_2$ are different within the depth of investigation. This is true for both vertical and non-vertical sections. Thus, the measurements are sensitive to resistivity anisotropy even in vertical wells. As shown in flowchart 300 of FIG. 3, a well can be divided into segments such that each segment contains at least two measurement positions for which the $0^{th}$ harmonic coefficients are non-trivially different (step 302). For each such segment, the phase shift and attenuation can be determined based on an Equation 5 pair (step 304). For each segment, the determined phase shift and attenuation, with or without other measurements, may be used to invert for resistivity anisotropy and formation structure (step 306), and the result outputted (step 308).

Alternatively, if a vertical section is identified, a neighboring sub-section abutting the vertical section can be identified where the newly defined measurements of Equations 5a/5b, 5c/5d, or 5a'/5b' are not zero; that is, where the $0^{th}$ complex harmonic coefficients are non-trivially different from station to station within that sub-section. There may be one such sub-section at one end of the identified vertical section, or there may be one such sub-section at each end of the identified vertical section. As shown in flowchart 400 of FIG. 4, for each such neighboring sub-section, the phase shift and attenuation can be calculated as described above (step 402), and an inversion may be performed to obtain computed values for the resistivity anisotropy and formation structure (step 404). The theoretical induced voltage for a non-axial transmitter and non-axial receiver pair can be determined using the inverted formation parameters and compared to the measured voltage to generate one or more gain factors (step 406). The calculated gain factors are then used to correct the measured voltages for the identified vertical section (step 408). The corrected voltages may then be inverted for anisotropy and formation structure (step 410).

In addition to directional measurements in the non-vertical section(s), non-directional measurements may be obtained and used in the inversion calculations to obtain resistivity anisotropy and other formation structure information. For example, if ARC tool-type measurements are available, an inversion may be performed to determine horizontal resistivity and bed boundaries. That information can be used with the gain corrected voltages to invert for vertical resistivity. In addition, the theoretical voltages produced from the direct (air) signal may be subtracted from the gain corrected voltages to remove the primary field before the inversion.

For non-vertical sections, one can use the directional measurements defined in Equations 1a and 1b along with other measurements to invert for the resistivity anisotropy and the formation structure. The theoretical voltage for the non-vertical section can be calculated and compared with the measured voltage to obtain one or more gain factors for that non-vertical section. Those gain factors, assuming they are comparable to the gain factors of a nearby vertical section, can be used to correct the complex $0^{th}$ harmonic coefficients of the nearby vertical section, and the corrected complex $0^{th}$ harmonic coefficients of the vertical section can be inverted, with or without other measurements, to obtain resistivity anisotropy and formation structure information for the vertical section of the wellbore. In a refinement, the induced voltages $V(\vec{r}, \varphi)$ may be used instead of the $0^{th}$ harmonic coefficients $C_0(\vec{r}_1), \ldots C_0(\vec{r}_N)$.

The complex $0^{th}$ harmonic coefficients $C_0(\vec{r}_1), \ldots C_0(\vec{r}_N)$ from the segments exhibiting sufficient variance amongst $C_0(\vec{r}_1), \ldots C_0(\vec{r}_N)$ may be inverted directly to provide gain factors, resistivity anisotropy, and formation structure information for that segment. The gain factors are used to correct $C_0(\vec{r}_1), \ldots C_0(\vec{r}_N)$ for those sections that do not exhibit sufficient variance.

While only certain embodiments have been set forth, alternatives and modifications will be apparent from the above description to those skilled in the art. These and other alternatives are considered equivalents and within the scope of this disclosure and the appended claims.

What is claimed is:

1. A logging while drilling method to determine properties of a subterranean formation in a segment of a substantially vertical section of a wellbore, the method comprising:
   (a) rotating a drill string at a first axial location in the vertical section of the wellbore, the drill string including a drill bit and a logging while drilling tool having a transmitter receiver pair, the transmitter receiver pair consisting of a transverse transmitter and a tilted receiver;
   (b) causing the transverse transmitter to transmit an electromagnetic field into the formation at a first axial location in the vertical section while rotating in (a);
   (c) causing the tilted receiver to receive a first voltage induced by the electromagnetic field transmitted in (b);
   (d) translating the drill string to a second axial location in the vertical section of the wellbore;
   (e) causing the transverse transmitter to transmit an electromagnetic field into the formation at the second axial location in the vertical section while rotating in (d);

(f) causing the tilted receiver to receive a second voltage induced by the electromagnetic field transmitted in (e);
(g) processing the first and second voltages in combination to compute a single phase shift value and a single attenuation value of the segment of the vertical section of the wellbore;
(h) processing a mathematical inversion of the phase shift and the attenuation computed in (g) to obtain the properties of the subterranean formation.

2. The method of claim 1, wherein the properties of the subterranean formation include resistivity anisotropy and formation structure.

3. The method of claim 1, further comprising using other measurements in addition to the phase shift and attenuation to perform the inversion.

4. The method of claim 3, wherein the other measurements are from transmitter and receiver antennas having axial dipole moments.

5. A system to determine formation properties of a subterranean formation in a segment of a substantially vertical section of a wellbore, the system comprising:
a logging while drilling directional resistivity tool including a transverse transmitter and a tilted receiver; and
a processor configured to: (i) cause the transmitter to continually transmit an electromagnetic field into a subterranean formation while drilling; (ii) cause the receiver to continually receive voltages induced by the electromagnetic field transmitted in (i); (iii) evaluate the voltages received in (ii) to divide the vertical section into a plurality of segments such that each of the segments contains at least first and second distinct axial measurement positions for which the $0^{th}$ harmonic coefficients are not trivially different from one another; (iv) process the voltages received in (ii) at each of the first and second distinct axial measurement positions to compute corresponding first and second $0^{th}$ harmonic coefficients (v) process the first and second $0^{th}$ harmonic coefficients in combination to compute a phase shift and an attenuation for each segment; and (vi) process a mathematical inversion of the phase shift and the attenuation computed in (v) to obtain the formation properties of the subterranean formation.

6. The system of claim 5, wherein the directional resistivity tool is run into the wellbore on a drill string or a wired drill pipe.

7. The system of claim 5, wherein the processor is disposed on or near the directional resistivity tool.

8. The method of claim 1, wherein (g) comprises computing the phase shift and the attenuation of the segment using the following equations:

$$ATT = 20\log_{10}\left(\text{abs}\left(\frac{V_{xx}(\vec{r}_1) + V_{yy}(\vec{r}_1)}{V_{xx}(\vec{r}_2) + V_{yy}(\vec{r}_2)}\right)\right)$$

$$PS = \text{atan}\left(\frac{V_{xx}^i(\vec{r}_2) + V_{yy}^i(\vec{r}_2)}{V_{xx}^r(\vec{r}_2) + V_{yy}^r(\vec{r}_2)}\right) - \text{atan}\left(\frac{V_{xx}^i(\vec{r}_1) + V_{yy}^i(\vec{r}_1)}{V_{xx}^r(\vec{r}_1) + V_{yy}^r(\vec{r}_1)}\right)$$

wherein ATT represents the attenuation, PS represents the phase shift, $V_{xx}(\vec{r}_1)$ and $V_{yy}(\vec{r}_1)$ represent voltages received at the first axial location, $V_{xx}(\vec{r}_2)$ and $V_{yy}(\vec{r}_2)$ represent voltages at the second axial location, and superscripts r and i represent real and imaginary components of the voltages.

9. A logging while drilling method to determine properties of a subterranean formation, the method comprising:
(a) drilling a substantially vertical section of a subterranean wellbore, the drilling including rotating a drill string in the vertical section, the drill string including a logging while drilling tool having a transverse transmitter and a tilted receiver;
(b) causing the transmitter to continually transmit an electromagnetic field into the formation while drilling the vertical section in (a);
(c) causing the receiver to continually receive voltages induced by the electromagnetic field transmitted in (b);
(d) evaluating the voltages received in (c) to divide the vertical section into a plurality of segments such that each of the segments contains at least first and second distinct axial measurement positions for which the $0^{th}$ harmonic coefficients are not trivially different from one another;
(e) processing the voltages received in (c) at each of the first and second distinct axial measurement positions to compute corresponding first and second $0^{th}$ harmonic coefficients;
(f) processing the first and second $0^{th}$ harmonic coefficients in combination to compute a phase shift and an attenuation for each segment;
(g) processing a mathematical inversion of the phase shift and the attenuation computed in (f) to obtain the properties of the subterranean formation in each segment.

10. The method of 9, wherein at least one of the plurality of segments contains a third distinct axial measurement position for which the $0^{th}$ harmonic coefficients are trivially different from those of the first or second distinct axial measurement positions.

11. The method of claim 9, wherein (e) comprises computing the phase shift and the attenuation of the segment using the following equations:

$$ATT = 20\log_{10}\left(\text{abs}\left(\frac{C_0(\vec{r}_i)}{C_0(\vec{r}_j)}\right)\right)$$

$$PS = \text{atan}\left(\frac{C_0^i(\vec{r}_i)}{C_0^i(\vec{r}_j)}\right) - \text{atan}\left(\frac{C_0^i(\vec{r}_i)}{C_0^r(\vec{r}_i)}\right)$$

wherein ATT represents the attenuation, PS represents the phase shift, $C_0(\vec{r}_i)$ and $C_0(\vec{r}_j)$ represent the first and second first and second $0^{th}$ harmonic coefficients at the corresponding first and second distinct axial measurement positions $\vec{r}_i$ and $\vec{r}_j$, and superscripts r and i represent real and imaginary components of the harmonic coefficients.

12. The method of claim 1, wherein (g) further comprises processing a logarithmic ratio of the first voltage received at the first location in (c) and the second voltage received at the second location in (f) to compute the phase shift value and the attenuation value.

13. The method of claim 1, wherein:
(c) comprises receiving first and second voltages at the first location;
(f) comprises receiving first and second voltages at the second location; and
(g) further comprises processing a logarithmic ratio of a first linear combination of the first and second voltages received at the first location in (c) and a second linear combination of the first and second voltages received at the second location in (f) to compute the phase shift value and the attenuation value.

14. The method of claim 13, wherein the first linear combination comprises a sum of the first and second voltages received at the first location and the second linear combination comprises a sum of the first and second voltages received at the second location.

\* \* \* \* \*